(12) United States Patent
Gandrud

(10) Patent No.: US 6,817,253 B2
(45) Date of Patent: Nov. 16, 2004

(54) METHOD AND MEANS FOR MEASURING TORQUE IN HYDRAULIC POWER UNITS

(75) Inventor: Michael D. Gandrud, Ames, IA (US)

(73) Assignee: Sauer-Danfoss Inc., Ames, IA (US)

( * ) Notice: Subject to any disclaimer, the term of this patent is extended or adjusted under 35 U.S.C. 154(b) by 198 days.

(21) Appl. No.: 10/097,417

(22) Filed: Mar. 14, 2002

(65) Prior Publication Data

US 2003/0172747 A1 Sep. 18, 2003

(51) Int. Cl.$^7$ .............................................. B25B 23/14
(52) U.S. Cl. ................................................... 73/862.23
(58) Field of Search ......................... 73/862.22, 862.23, 73/862.24, 862.25, 862.08, 862.333, 862.331, 862.334, 862.335

(56) References Cited

U.S. PATENT DOCUMENTS

| | | | |
|---|---|---|---|
| 3,932,112 A | 1/1976 | Garshelis | |
| 3,939,448 A | 2/1976 | Garshelis | |
| 3,959,751 A | 5/1976 | Garshelis | |
| 3,961,297 A | 6/1976 | Garshelis | |
| 4,152,930 A | * 5/1979 | Fujimoto et al. | 73/862.29 |
| 4,760,745 A | 8/1988 | Garshelis | |
| 4,874,053 A | * 10/1989 | Kimura et al. | 180/443 |
| 4,882,936 A | 11/1989 | Garshelis | |
| 4,896,544 A | 1/1990 | Garshelis | |
| 4,950,988 A | 8/1990 | Garshelis | |
| 4,953,411 A | * 9/1990 | Coenen et al. | 73/862.324 |
| 5,052,232 A | 10/1991 | Garshelis | |
| 5,167,148 A | * 12/1992 | Black et al. | 73/121 |
| 5,195,377 A | 3/1993 | Garshelis | |
| 5,351,555 A | 10/1994 | Garshelis | |
| 5,367,257 A | 11/1994 | Garshelis | |
| 5,465,627 A | 11/1995 | Garshelis | |
| 5,520,059 A | 5/1996 | Garshelis | |
| 5,591,925 A | 1/1997 | Garshelis | |
| 5,706,572 A | 1/1998 | Garshelis | |
| 5,708,216 A | 1/1998 | Garshelis | |
| 6,047,605 A | 4/2000 | Garshelis | |
| 6,145,387 A | 11/2000 | Garshelis | |
| 6,330,833 B1 | * 12/2001 | Opie et al. | 73/862.333 |
| 6,414,482 B1 | * 7/2002 | Mase | 324/207.2 |
| 6,520,274 B1 | * 2/2003 | McElmeel, Jr. et al. | 180/444 |
| 6,601,462 B1 | * 8/2003 | Ueno et al. | 73/862.337 |

OTHER PUBLICATIONS

"The New Standard for Torque Sensing", Magnetoelastic Devices Inc.—Copyright 1998.

* cited by examiner

*Primary Examiner*—Max Noori

(57) ABSTRACT

A hydraulic power unit in a housing has a power shaft associated with the power unit. A transducer adapted for measuring torque is mounted in the housing. A stationary portion of the transducer is mounted in non-contact relation to the shaft. A method for measuring torque in the power unit involves placing the transducer in the position described.

27 Claims, 2 Drawing Sheets

METHOD AND MEANS FOR MEASURING TORQUE IN HYDRAULIC POWER UNITS

BACKGROUND OF THE INVENTION

Measuring the torsional forces acting on a shaft, particularly a power shaft, is often desirable. Such shafts are often found in hydraulic power units. Hydraulic power units such as pumps, motors, and transmissions are used to convert and transmit power between devices in many types of equipment. For example, a hydraulic pump may convert the power of an internal combustion engine or other source into a flow of high pressure hydraulic oil that can be used for performing a useful function in a machine. This flow of high pressure oil may be used to power a hydraulic motor that propels a wheel or track in a vehicle such as a tractor, bulldozer, or crane. In other instances this flow of high pressure oil may be used to operate hydraulic cylinders that perform such functions as manipulating the excavation bucket on a back hoe or for another device.

The primary measurements that are useful for determining performance and controlling hydraulic power units are the fluid pressure, fluid flow, shaft rotation speed, and shaft torque. Pressure, flow, and speed are routinely measured with readily available sensors. In the past, pressure and flow sensors have been integrated into hydraulic power units such as hydrostatic pumps and motors. Examples of using speed sensors are given in U.S. Pat. No. 5,325,055.

Several technologies are available for measuring the torque experienced by a rotating shaft. In one common technology, a series of strain gauges are bonded in strategic locations to the shaft. The electrical signals that are produced by these strain gauges are often transferred from the rotating shaft to the fixed portion of a machine through a series of slip rings. In another common embodiment of torque sensing, rotary transformers are used to provide power to the rotating electrical circuit and also to transfer the measured torque signal from the rotating shaft to the non-rotating portion of the machine. Another torque measurement system involves the attachment of a small radio transmitter and power supply to the rotating shaft. With such a radio telemetry system, the torque is normally measured by strain gauges then transmitted by analog or digital radio signals to a receiver positioned on the stationary portions of a machine.

Torque measurement systems which have been used with hydraulic power units such a hydrostatic pump or motor generally suffer from all of the following:

High cost

Large size

Poor reliability

Impracticality for serial production

Lack of integration with the hydraulic power unit

When rotating shaft type torque transducers have been used in the past with hydraulic power units such as hydrostatic pumps and motors, their high cost and large size has limited their use to that of testing during the product development phase. Non-contact torque transducers have not been integrated within a hydraulic power unit nor have they been incorporated into such a unit for serial production.

In the prior art cited above, all torque sensing systems are "contact" methods as opposed to "non-contact" methods. In these cases, an electronic transducer, and often signal conditioning or conversion electronics are attached to the rotating shaft. The "contact" methods of torque measurement have the deficiencies cited above.

Non-contact torque transducers have also been developed in the prior art. An example of such a device is shown in U.S. Pat. No. 5,052,232. In this system, the rotating shaft is circularly magnetized in such a manner that a measurable axial magnetic field is created outside of the shaft which is indicative of the torque experienced by the shaft. While this system provides a non-contact means of torque measurement, such torque transducers have been only used with hydraulic power units as an external module which is separate from the hydraulic power unit, not integrated into the hydraulic power unit, and can be connected to any power unit for laboratory testing or for whatever purpose. The prior art has not demonstrated the integration of a magnetoelastic torque transducer into a hydraulic power unit.

In other prior art, the shaft torque of a hydraulic power unit has been estimated by the following formula:

$$\tau \approx \frac{d \cdot \Delta p}{2 \cdot \Pi \cdot e}$$

This formula is used to estimate torque $\tau$ where the displacement d is either known or measured, differential pressure $\Delta p$ is measured, and e is the torque efficiency of the power unit. This formula only provides an estimate of torque since the torque efficiency "e" is affected by many factors that are not readily ascertainable under operation. Therefore, there are a number of problems associated with determining and controlling or limiting the torque that is experienced by the shaft of a hydraulic power unit.

Therefore, it is a primary object of the invention to provide an improved system and method for determining the torque of hydraulic power units such as hydraulic pumps, hydraulic motors, axial piston pumps, axial piston motors, radial piston pumps, radial piston motors, gear pumps, gear motors, vane pumps, vane motors, roller vane pumps, roller vane motors, gerotor pumps, gerotor motors, geroller pumps, geroller motors, swash plates, valves, or hydraulic actuators of any kind.

A further object of the invention is to provide a system and method for the integration of a non-contact torque transducer into a hydraulic power unit such as the types described above.

Another object of the present invention is to provide a method for integrating such a non-contact torque transducer into a hydraulic power unit.

Yet another object of the invention is to provide for integrating a magnetoelastic torque transducer into a hydraulic power unit.

A still further object of the invention is to provide a set of specific regions of the shaft within a hydraulic power unit that may be circularly magnetized for use as part of a magnetoelastic torque transducer.

Another object of the invention is to provide a system and method for integrating a torque transducer with a speed transducer and then integrating these into a hydraulic power unit.

A further object of the invention is to integrate a torque transducer and a speed sensor within a single sensor.

Yet a further object of the invention is to provide a system and method for integrating a torque transducer with a ball bearing, roller bearing, sleeve bearing, plain bearing, or other bearing.

Another object of the invention is to provide a system and method for producing a speed and torque sensing transducer that is integrated into a ball bearing, roller bearing, journal bearing, plain bearing, or other bearing.

A further object of the invention is to provide a method of producing a ring of material in place on a shaft rather than producing the ring separately and installing it onto the shaft.

These and other objects of the invention will become apparent from the following description.

BRIEF SUMMARY OF THE INVENTION

This invention relates to an apparatus that consists of a hydraulic power unit such as a hydraulic pump, motor, or transmission with an integrated non-contact torque transducer. The term "integrated" as used herein means that the transducer is contained within. The unit is an integral part thereof, usually at the time of manufacture. Additionally, the invention relates to a method for integrating a circularly magnetized torque transducer into such a hydraulic unit. The invention further relates to the integration of both a torque sensor and a speed sensor into such a hydraulic power unit. Additionally, the invention relates to a method of integrating a torque transducer into a bearing. Finally, the invention relates to an enhanced method of manufacturing a torque transducer.

The invention is a hydraulic power unit such as a hydraulic pump or hydraulic motor with an integrated non-contact torque transducer. The integrated torque sensor uses magnetoelasticity, magnetostriction, stress wires, "guitar string" elements, strain gauges, surface acoustic waves, acoustic, light, optical, capacitance, inductance, resistance, reluctance, radio telemetry, strain members, charge coupled devices, or micromaching to make a non-contact determination of the torque in a shaft. Such a device is capable of sensing the torque in the shaft of a hydraulic power unit such as a hydrostatic pump or motor, and may optionally be adapted for sensing the speed of rotation or instantaneous rotational position of such a unit. A control system that is capable of sensing the measurement of the torque transducer, and possibly other information may optionally be used to control the torque on a hydraulic power unit. As this additional information concerning torque and speed of a hydraulic power unit is measured, improved control and other improvements result.

The preferred embodiment could use a magnetoelastic torque sensing technology. In magnetoeleastic torque sensing technology, a region of appropriate magnetic material which makes up the shaft or is attached to the shaft is circularly magnetized. Under a torque induced strain, the circularly magnetized magnetic material will experience a distortion in magnetic domains. This distortion of magnetic domains results in an axial magnetic field with a magnitude and direction which is indicative of magnitude and direction of the applied torque.

The preferred embodiment further uses a series of features that are spaced around the circumference of the shaft. An appropriate sensing means is further used to sense the passing of these features as the shaft rotates. By sensing the time between passing of these features, or by measuring the frequency with which these features pass the sensor, the rotational speed of the shaft is determined. An example of speed sensing in a hydraulic power unit without torque measurement is given in U.S. Pat. No. 5,325,055. An example of combined speed and torque sensing is shown in U.S. Pat. No. 5,591,925. Neither of these patents contemplate integration of a non-contact torque and speed sensor into a hydraulic power unit.

The data obtained from an integrated non-contact torque and speed sensor is used to improve machine operation in several ways. First, this information is used to limit the torque of a hydraulic power unit. Torque may be limited for the purpose of protecting a load from damage or preventing the stalling of an internal combustion engine. Second, this information is used for the purpose of enhanced control. Measured torque information is useful in various control schemes which are sometimes designed to enhance traction and reduce or prevent wheel slippage, or for other purposes.

In particular, the present invention provides for control of a hydraulic system which incorporates an integrated torque transducer which is capable of measuring actual torque, as opposed to merely estimating torque through calculations which are based on other measured and estimated quantities. As torque is directly measured by the apparatus of the present invention, the information needed for improved control and monitoring is available.

DETAILED DESCRIPTION OF THE INVENTION

Figure 1:
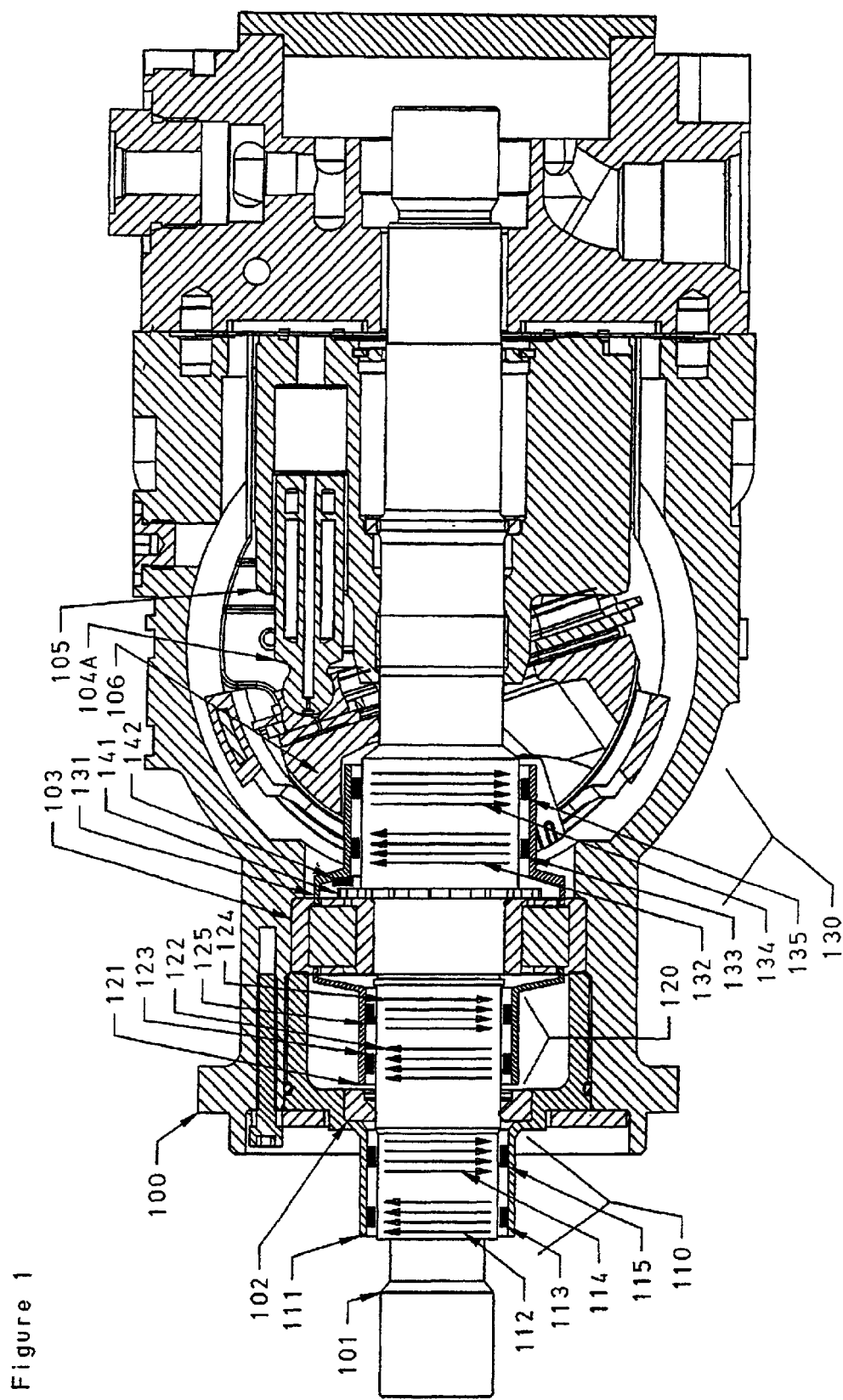
FIG. 1 is a sectional view of an axial piston hydraulic power unit with non-contact torque transducers integrated at three different locations.

FIG. 1 is a cross sectional view of a variable displacement axial piston hydraulic power unit 100 and housing. The general operation of such an axial piston power unit is widely known and is therefore not disclosed here. This Figure depicts non-contact torque transducers integrated into the unit at three distinct locations or regions 110, 120, 130. It is likely that only one torque transducer will be used in most embodiments. Since one of the key objects of the present invention is the integration of a non-contact torque transducer into a hydrostatic unit, several locations are disclosed. In the drawing, the hydraulic power unit incorporates a splined shaft 101. The splined shaft 101 is a means by which the hydraulic power unit is connected to and driven by an external source of mechanical power such as an internal combustion engine (not shown). Such a shaft alternatively provides a means for a hydraulic power unit to be connected to the load or device which requires mechanical power, such as a wheel. In general, it is desirable to sense torque within a hydraulic power unit between the splined shaft 101 and the cylinder block, 105.

Torque transducer region 110 demonstrates how a torque transducer is installed onto the shaft in the region between the spline 101 and the shaft seal 102. In the preferred embodiment, one or more regions of the shaft are circularly magnetized within the region of the shaft between the shaft spline 101 and the seal 102.

Torque transducer region 120 demonstrates how a torque transducer is installed onto the shaft in the area between the shaft seal 102 and the front bearing 103. In the preferred embodiment, one or more regions of the shaft are circularly magnetized within the region of the shaft between the shaft seal 102 and the front bearing 103.

Torque transducer region 130 demonstrates how a torque transducer is installed onto the shaft in the area between the front bearing 103 and the cylinder block 105. In the preferred embodiment, one or more regions of the shaft are circularly magnetized within the region of the shaft between the front bearing 103 and the cylinder block 105.

In the preferred embodiment, the possible torque transducers 110, 120, 130 use magnetoelastic sensing technology. In the preferred embodiment, the shaft is circularly magnetized with one or more polarized sections 112, 122, 132. One or more sections are optionally circularly magnetized in opposing polarization sections 114, 124, 134. A plurality of sensors 113, 115, 123, 125, 133, 135 are used for sensing the axial magnetic field emitted by the circularly magnetized shaft. A support means 111, 121, 131 is provided for mounting magnetic field sensors 113, 115, 123, 124, 133, 135 in proximity to the shaft. Various types, numbers, arrangements, and placements of magnetic field sensors are contemplated.

Variations are contemplated as to the means of magnetizing regions of the shaft. Variations are also contemplated without limit as to the geometry of the region of the shaft to be magnetized. The preferred embodiment uses a circularly magnetized one piece solid shaft. Another embodiment is the installation of a ring of appropriate magnetic material onto the shaft. Yet another embodiment uses a circularly magnetized hollow shaft.

The preferred embodiment of a torque transducer incorporates a method for measuring shaft rotational speed or instantaneous shaft position. The preferred embodiment of a speed or position indicator involves producing a series of physical configurations or features spaced around the circumference of the shaft. Both uniform and non-uniform distribution of these configurations can be used. In one embodiment, tooth or gear like projections can be machined or formed as part of the shaft. In another arrangement, a gear like ring with a series projections is installed onto the shaft, or a segmentally magnetized ring is installed onto the shaft. Whatever components, such as ring 141, are present around the circumference of the shaft, a sensor 142 must be provided for sensing the position or the passing rate of these features.

In the preferred embodiment, sensor positioning rings 121, 131 are attached to bearing 103. In the preferred embodiment, speed indicating ring 141 is attached to the inner race of the bearing. This assembly reflects another object of the present invention: a speed and torque sensing bearing.

In the field of magnetoelastic torque transducers, special and sometimes expensive materials are used to form the magnetically active region. Rather than making an entire shaft from these special or expensive materials, it is common practice to install a ring on the shaft which is made of the appropriate material.

Prior art has formed this ring with a variety of manufacturing processes.

In the instant invention, the ring can have notches on it (which are conventional). The passing of these notches as a shaft turns are sensed as a means of measuring speed of rotation of a shaft. In the prior art, notches were machined, cut, broached, or otherwise formed after the ring was formed. A novel aspect of the present invention is the formation of a ring in place on a shaft. This is novel in that the prior art has formed a ring separately then later attached that ring onto a shaft. A further novel aspect of the present invention is the use of net shape manufacturing processes such as powder metallurgy, metal injection molding, or die casting to form notches in a ring.

A ring may optionally have speed measurement notches incorporated on it is formed-through near net shape manufacturing processes directly onto the shaft. In one process, a ring is formed onto a shaft with powdered metallurgy, and subsequently sintered onto the shaft. In another process, the ring is formed onto the shaft through the use of metal injection molding and subsequently sintered onto the shaft. The present invention is novel in that a ring is formed around the shaft rather than formed separate from the shaft and then installed onto the shaft. An apparatus for manufacturing such a ring is disclosed in the following description of FIG. 2.

Figure 2:
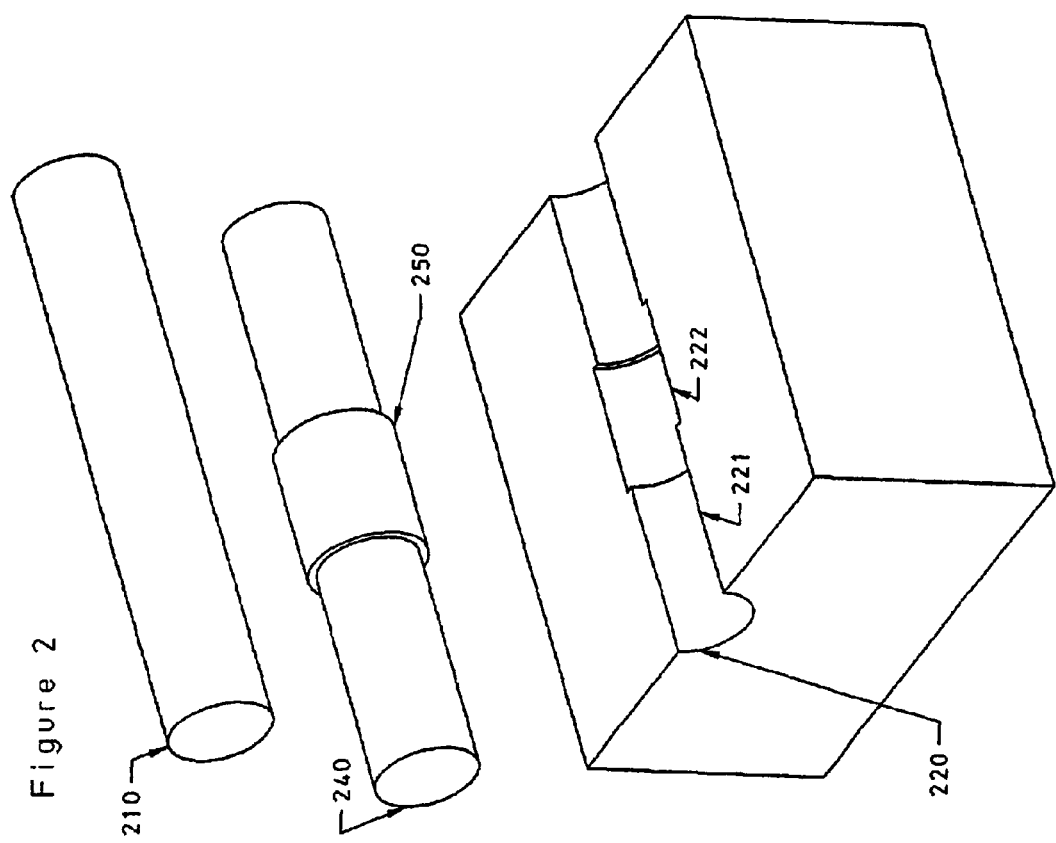
FIG. 2 is an exploded view of components used to fabricate a magnetic ring onto a shaft.

FIG. 2 documents the invention of an improved method of forming rings on shafts which are used in magnetoelastic or similar torque transducers and the like. A ring is formed on a shaft rather than formed separately and later installed onto a shaft. The shaft 210 is inserted into a first mold half 220. The first mold half seals around a portion of the shaft 221 and has a cavity 222. A second similar mold half 220 (not shown) is placed on top of the first mold half 220. A material is forced into the cavity 222 between the shaft 210 and the mold halves 220. The mold halves are taken apart and a shaft 240 with a ring 250 formed onto it is removed. The shaft 240 may require additional processing such as sintering, brazing or heat treating or any other process of the like.

The system of this invention includes at least one hydraulic power unit with an integrated torque transducer, and a system controller. A controller (not shown) can use information from the torque sensor for purposes such as the following:

Monitoring power unit performance

Controlling power unit in such a way as to limit the torque or power which is required of a power source. One such example is to reduce the pressure and or displacement of a hydraulic power unit in order to prevent overpowering a power source such as stalling an internal combustion engine.

Controlling hydraulic power units in order to improve control such that vehicle wheel slip is reduced or prevented.

Display operating torque or power to a machine operator for interest or other purposes.

It is therefore seen that this invention will achieve at least all of its stated objectives.

What is claimed is:

1. A hydraulic power unit including a housing, a hydraulic power means, and a power shaft associated with the power means, comprising, a transducer adapted for measuring torque mounted in the housing in non-contact relation to the shaft adjacent portion of the shaft imposed with a magnetic field;

the hydraulic power unit is selected from the group consisting of hydraulic pumps, hydraulic motors axial piston pumps, axial piston motors, radial piston pump radial piston motors, gear pumps, gear motors, vane pumps, vane motors, roller vane pumps, roller vane motors, gerotor pumps, gerotor motors, geroller pumps, geroller motors, awash plates, valves, and hydraulic actuators; and the shaft is circularly magnetized in one or more of the regions of the shaft including: a region between an outside shaft spline and a shaft seal; a region between the shaft seal and a shaft bearing; and a regions between the bearing and a piston block.

2. The unit of claim 1 wherein a system for measuring rotational speed is associated with the shaft.

3. The system in claim 1 wherein the torque transducer incorporates an element where one or more zones are circularly magnetized.

4. The unit of claim 3 wherein the portion of the shaft is a ring which is formed in place on the shaft.

5. The unit of claim 4 wherein the ring includes an irregular configuration which is spaced around the circumference of the shaft for indicating rotational speed.

6. The unit in claim 5 further characterized by the configuration being formed through near net shape manufacturing methods.

7. The ring in claim 4 wherein the ring is formed in place onto the shaft through methods of powder metallurgy.

8. The ring in claim 4 wherein the ring is formed with metal injection molding.

9. A method for measuring torque in a hydraulic power unit including a housing, a hydraulic power means, and a power shaft associated with the power means, comprising, placing a transducer adapted for measuring torque in the housing in non-contact relation to the shaft adjacent to the shaft imposed with a magnetic field, wherein the shaft is circularly magnetized in one or more of the regions of the shaft including: a region between an outside shaft spline and a shaft seal; a region between the shaft seal and a shaft bearing; and region between the bearing and a piston block.

10. A hydraulic power unit mounted within a housing, comprising, a power shaft rotatably mounted in the hydrostatic power unit and being subject to torque in normal operation, and a transducer integrally mounted within the housing adjacent the shaft for measuring torque, with the transducer being free from contact with the shaft, wherein the shaft is mounted in at least one bearing, and the transducer is mounted in the bearing.

11. The structure of claim 10 wherein the hydraulic power unit is one selected from the group consisting of hydraulic pumps, hydraulic motors, axial piston pumps, axial piston motors, radial piston pumps, radial piston motors, gear pumps, gear motors, vane pumps, vane motors, roller vane pumps, roller vane motors, gerotor pumps, gerotor motors, geroller pumps, geroller motors, swash plates, valves, and hydraulic actuators.

12. The structure of claim 10 wherein the shaft is magnetized adjacent the transducer.

13. The structure of claim 12 wherein the transducer works on the principal of magnetoelasticity.

14. A hydraulic power unit including a housing, a hydraulic power means, and a power shaft associated with the power means, comprising, a magnetic transducer adapted for measuring torque mounted in the housing adjacent a portion of the shaft imposed with a magnetic field, wherein the magnetic torque transducer incorporates an element where one or more zones are circularly magnetized.

15. The unit of claim 14 wherein the hydraulic power unit is selected from the group consisting of hydraulic pumps, hydraulic motors, axial piston pumps, axial piston motors, radial piston pumps, radial piston motors, gear pumps, gear motors, vane pumps, vane motors, roller vane pumps, roller vane motors, gerotor pumps, gerotor motors, geroller pumps, geroller motors, swash plates, valves, and hydraulic actuators.

16. The unit of claim 15 wherein the magnetic torque transducer is a magnetoelastic torque transducer.

17. The unit of claim 14 wherein the portion of the shaft is a ring which is formed in place on the shaft.

18. The unit of claim 14 wherein the ring includes a series of configuration features which are spaced around the circumference of the shaft for indicating rotational speed.

19. The unit of claim 14 wherein the shaft is circularly magnetized in one or more of the regions of the shaft including:

a region between an outside shaft spline and a shaft seal;

a region between the shaft seal and a shaft bearing; and a region between the bearing and a piston block.

20. The unit in claim 18 further characterized by the features being formed through near net-shape manufacturing methods.

21. The unit of claim 20 wherein the ring is formed in place onto the shaft through methods of powder metallurgy.

22. The ring in claim 20 wherein the ring is formed with metal injection molding.

23. A torque sensing bearing assembly including a bearing and mounted within a housing, comprising, A non-contact torque sensing transducer mounted within the housing and associated with the bearing;

a circularly magnetized element from among a shaft inserted into the torque sensing bearing; and an inner race of the bearing which is configured to strain when torque is applied.

24. The assembly in claim 23 further comprising a system for measuring a rotational speed.

25. The assembly in claim 23 further comprising a system for measuring rotational position.

26. The assembly in claim 23 wherein the transducer uses magnetic torque sensing technology.

27. The assembly of claim 26 wherein the transducer uses magnetoelastic torque sensing technology.

* * * * *

UNITED STATES PATENT AND TRADEMARK OFFICE
CERTIFICATE OF CORRECTION

PATENT NO. : 6,817,253 B2
DATED : November 16, 2004
INVENTOR(S) : Michael D. Gandrud It is certified that error appears in the above-identified patent and that said Letters Patent is hereby corrected as shown below:

Column 6,
Line 44, after the word "motors" insert a comma.
Line 45, should read as follows: -- piston pumps, axial piston motors, radial piston pumps, --
Line 49, cancel the word "awash" and insert -- swash --.
Line 54, cancel "regions" and insert -- region --.

Signed and Sealed this

Fifth Day of April, 2005

JON W. DUDAS
*Director of the United States Patent and Trademark Office*